(12) United States Patent
Long

(10) Patent No.: US 10,922,634 B2
(45) Date of Patent: Feb. 16, 2021

(54) DETERMINING COMPLIANCE OF A TARGET ASSET TO AT LEAST ONE DEFINED PARAMETER BASED ON A SIMULATED TRANSIENT RESPONSE CAPABILITY OF THE TARGET ASSET AND AS A FUNCTION OF PHYSICAL OPERATION DATA MEASURED DURING AN ACTUAL DEFINED EVENT

(71) Applicant: General Electric Company, Schenectady, NY (US)

(72) Inventor: Christopher Eugene Long, Greenville, SC (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 15/607,085

(22) Filed: May 26, 2017

(65) Prior Publication Data
US 2018/0341882 A1 Nov. 29, 2018

(51) Int. Cl.
*G06Q 50/06* (2012.01)
*G06F 30/00* (2020.01)
(Continued)

(52) U.S. Cl.
CPC ............. *G06Q 10/06* (2013.01); *G06F 30/00* (2020.01); *G06Q 50/06* (2013.01); *G06F 30/20* (2020.01); *G06F 2119/06* (2020.01)

(58) Field of Classification Search
CPC .. G06F 30/20; G06F 2119/06; G06F 2111/10; G06Q 50/06
See application file for complete search history.

(56) References Cited

U.S. PATENT DOCUMENTS 4,122,498 A * 10/1978 Dyer ..................... G07C 1/10
346/20
4,613,952 A * 9/1986 McClanahan ............ G09B 9/00
434/118
(Continued)

FOREIGN PATENT DOCUMENTS

WO 2015199818 A1 12/2015
WO 2016109725 A1 7/2016

OTHER PUBLICATIONS

Zhong, Zhian, Power Systems Frequency Dynamic Monitoring System Design and Appilcations Virginia Polytechnic Institute and State University, Jul. 2005 (Year: 2005).*
(Continued)

*Primary Examiner* — Scott L Jarrett
(74) *Attorney, Agent, or Firm* — Amin, Turocy & Watson, LLP

(57) ABSTRACT

Distribution network response capability monitoring and compliance determination is provided herein. A method can comprise generating, by a system comprising a processor, a model of a target asset based on operation data measured at the target asset during a defined event. The model is configured to simulate a transient response capability of the target asset. The method can also comprise determining, by the system, a compliance of the target asset to at least one defined parameter based on the transient response capability of the target asset during a simulated event and as a function of the operation data measured during the defined event.

19 Claims, 12 Drawing Sheets

(51) Int. Cl.
*G06F 30/20* (2020.01)
*G06F 119/06* (2020.01)
*G06Q 10/06* (2012.01)

(56) References Cited

U.S. PATENT DOCUMENTS

| | | | | |
|---|---|---|---|---|
| 4,796,194 | A * | 1/1989 | Atherton | G03F 7/70525 257/E21.525 |
| 5,467,291 | A * | 11/1995 | Fan | G06F 17/5036 703/14 |
| 5,483,462 | A * | 1/1996 | Chiang | H02H 3/06 307/132 EA |
| 8,019,580 | B1 * | 9/2011 | Chandra | G06F 30/33 703/6 |
| 8,682,585 | B1 * | 3/2014 | Hoff | G06Q 10/04 702/3 |
| 9,466,034 | B2 * | 10/2016 | Viassolo | G06Q 10/00 |
| 10,222,791 | B2 * | 3/2019 | Kanada | G05B 23/0278 |
| 2004/0030667 | A1 * | 2/2004 | Xu | G06K 9/6217 |
| 2006/0217870 | A1 * | 9/2006 | Hoff | G05B 23/0254 701/100 |
| 2008/0071427 | A1 | 3/2008 | Szepek et al. | |
| 2008/0215302 | A1 * | 9/2008 | Nasle | G06F 30/20 703/13 |
| 2010/0179800 | A1 * | 7/2010 | Nam | G01R 31/088 703/18 |
| 2011/0257801 | A1 * | 10/2011 | Kumula | F01D 15/10 700/287 |
| 2012/0054709 | A1 * | 3/2012 | Tsai | G06F 17/5009 716/122 |
| 2012/0083927 | A1 * | 4/2012 | Nakamura | G05B 13/026 700/278 |
| 2012/0101644 | A1 * | 4/2012 | Evans | G05B 13/026 700/287 |
| 2012/0109618 | A1 * | 5/2012 | Tsai | G06Q 10/0639 703/18 |
| 2012/0210257 | A1 * | 8/2012 | Mosley | F01K 13/02 715/764 |
| 2012/0310559 | A1 | 12/2012 | Taft | |
| 2012/0323507 | A1 * | 12/2012 | Hasegawa | H02S 50/10 702/59 |
| 2013/0046519 | A1 * | 2/2013 | Esakki | G06F 17/5004 703/2 |
| 2013/0191052 | A1 | 7/2013 | Fernandez et al. | |
| 2013/0257054 | A1 | 10/2013 | Ouellet | |
| 2013/0261820 | A1 | 10/2013 | Meier et al. | |
| 2014/0207502 | A1 * | 7/2014 | Noda | G06Q 50/06 705/7.11 |
| 2014/0257526 | A1 * | 9/2014 | Tiwari | G05B 13/02 700/29 |
| 2014/0278332 | A1 * | 9/2014 | Grammatikakis | G06F 17/5009 703/18 |
| 2015/0100282 | A1 * | 4/2015 | Shokooh | G06F 17/5009 703/2 |
| 2015/0377057 | A1 | 12/2015 | Desabhatla | |
| 2016/0047765 | A1 * | 2/2016 | Feng | H01F 27/402 374/4 |
| 2016/0084233 | A1 * | 3/2016 | Evans | F03D 17/00 73/112.01 |
| 2016/0139212 | A1 * | 5/2016 | Lin | G06F 17/5036 |
| 2016/0148106 | A1 * | 5/2016 | Britton | H02J 3/00 706/14 |
| 2016/0190963 | A1 | 6/2016 | Thatcher et al. | |
| 2016/0268811 | A1 * | 9/2016 | Bell | H02J 13/0006 |
| 2016/0299999 | A1 * | 10/2016 | James | G06F 17/5009 |
| 2016/0365735 | A1 * | 12/2016 | Raczynski | H02J 3/46 |
| 2017/0025997 | A1 * | 1/2017 | Fujimoto | G06Q 50/06 |
| 2017/0054784 | A1 * | 2/2017 | Panattu | H04L 65/80 |
| 2018/0175790 | A1 * | 6/2018 | Sanfilippo | H02S 50/10 |
| 2018/0330083 | A1 * | 11/2018 | Abbaszadeh | G06N 20/00 |

OTHER PUBLICATIONS

Certification of grid code compliance—Service Specification DNV-GL, DNVGL-SE-0124, Mar. 2016 (Year: 2016).*

Sahni, Mandhir, Dynamic Parameter Estimation: Bridging the gap between simulation and real world power system response Blogs. DNVGL.com, Oct. 27, 2014 (Year: 2014).*

Vugrin, Eric et al., Electrical Power System Modeling and Analysis, Sandia National Laboratories, May 2013 (Year: 2013).*

Power System Model Validation North American Electric Reliability Corporation, Dec. 2010 (Year: 2010).*

Johnson, Jay et al., Photovoltaic Frequency-Watt Curve Design for Frequency Regulation and Fast Contingency Reserves IEEE, 2016 (Year: 2016).*

Neely, J. et al., Evaluation of PV Frequency-Watt Function for Fast Frequency Reserves, IEEE, 2015 (Year: 2015).*

Abourida, Simon et al., Real-Time Power system Simulation: EMT vs. Phasor OPAL-RT Technologies, White Paper, 2016 (Year: 2016).*

Validation and Accreditation of Transient Stability Results Power Systems Engineering Research Center, Sep. 2011 (Year: 2011).*

* cited by examiner

DETERMINING COMPLIANCE OF A TARGET ASSET TO AT LEAST ONE DEFINED PARAMETER BASED ON A SIMULATED TRANSIENT RESPONSE CAPABILITY OF THE TARGET ASSET AND AS A FUNCTION OF PHYSICAL OPERATION DATA MEASURED DURING AN ACTUAL DEFINED EVENT

TECHNICAL FIELD

The subject disclosure relates generally to modeling of a target asset based on physical operation data measured at the target asset during a defined event, simulating a transient response capability of the target asset, and determining compliance of the target asset to at least one defined parameter based on the simulated transient response capability of the target asset and as a function of the operation data measured during the defined event.

BACKGROUND

Distribution networks, which include power plants, can employ gas turbines as a source of power to satisfy at least a portion of consumers' overall electrical demand Power plants are subject to events (e.g., distribution network or grid events) that can, at least temporarily, disrupt generation and output of power, which can negatively impact consumers. Therefore, local regulations have been developed to specify how assets of the power plants should perform during the disruptive events. However, it is difficult to test the assets to determine conformance to the local regulations with a high degree of confidence.

The above-described deficiencies of distribution network operations are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments provide a method that can comprise generating, by a system comprising a processor, a model of a target asset based on physical operation data measured at the target asset during a defined event. The model can be configured to simulate a transient response capability of the target asset. The method can also comprise determining, by the system, a compliance of the target asset to at least one defined parameter based on the simulated transient response capability of the target asset and as a function of physical operation data measured during the defined event. The defined event can be an actual, or real-world, event Also, in one or more embodiments, provided is a system that can comprise a memory that stores executable components and a processor, operatively coupled to the memory, that executes the executable components. The executable components can comprise a forecast manager that generates a model of a target asset. The model can simulate a transient response capability of the target asset and can be based on operation data measured at the target asset during a defined event. The executable components can also comprise a compliance manager that determines a level of compliance of the target asset to at least one defined parameter based on the transient response capability of the target asset during a simulated event and as a function of the operation data measured during the defined event.

In addition, according to one or more embodiments, provided is a non-transitory computer-readable medium, comprising executable instructions that, when executed by a processor, facilitate performance of operations. The operations can comprise capturing signals measured by a data recorder during a defined event and retaining the signals in a database. The data recorder can be associated with a first target asset. Further, the signals can be mapped to the defined event. The signals can comprise a first transient response capability and a response compliance of the first target asset. The operations can also comprise generating a model of a second target asset based on the signals measured during the defined event. The model can be configured to simulate a second transient response capability of the second target asset based on the first transient response capability and the response compliance of the first target asset. The operations can also comprise determining a compliance of the second target asset to at least one defined parameter based on the second transient response capability of the second target asset during a simulated event and as a function of the signals measured during the defined event.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Discussed herein are various aspects that relate to distribution network response capability monitoring and compliance determination. Power-generating plant assets, such as gas turbines, generate power onto a distribution network or "grid." A governing body can establish expectations (e.g., local regulations and/or or local codes) for each asset or group of assets and can specify how the one or more assets should support the grid when a "grid event" occurs. "Grid events" are upsets in grid frequency driven by sudden changes in power generation or demand During such an event, surviving power generation assets are expected to comply with the local regulations. In an example, a local regulation can specify that during a grid event, the surviving power generation assets should pick-up or shed extra load (output) to re-balance generation and demand in order to stabilize grid frequency. Compliance to the local regulations can help minimize disruptions experienced by consumers that receive power over the grid.

For example, if there are ten assets (e.g., power plants, gas turbines, and so on) that are producing power and one of the assets experiences a problem and can no longer produce power, the other nine assets in the grid should be configured to absorb the balance. In an example, the expectation could be that all the assets on the grid (e.g., the other nine assets in this example) would have to increase their respective output amount to ensure there is a constant balance of supply and demand in the grid (e.g., load balancing).

As mentioned, assets are governed by regional or local code regulations, which can provide a metric in terms of how well or how fast the asset would have to respond to a grid event. The various aspects provided herein can mine operational data from actual grid events and utilize the mined data to construct and tune models of transient asset capability. Further, the models can be utilized to simulate how the asset(s) would perform relative to local grid regulations (e.g., predictive analysis).

Figure 1:
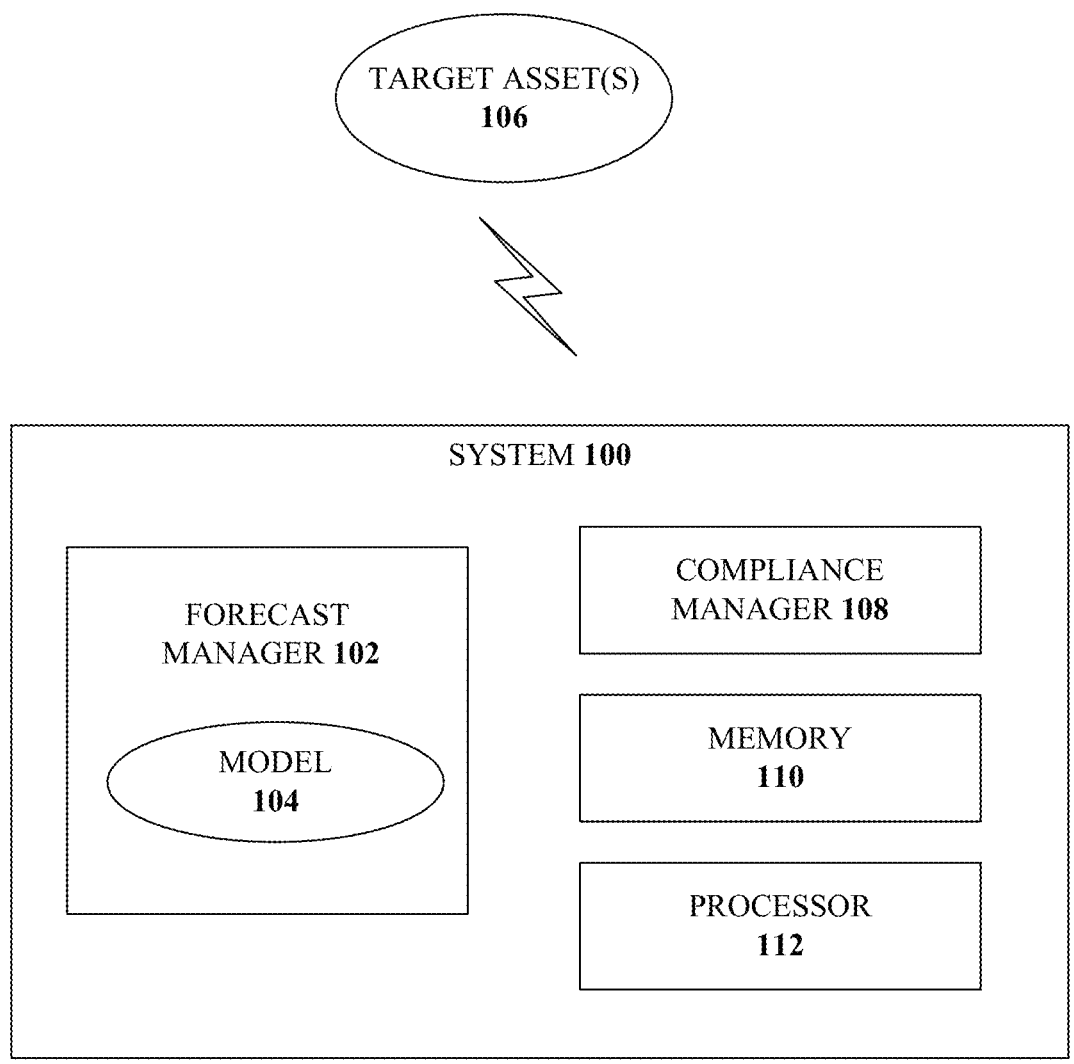
FIG. 1 illustrates an example, non-limiting, system for determining distribution network response capability and compliance in accordance with one or more embodiments described herein.

FIG. 1 illustrates an example, non-limiting, system 100 for determining distribution network response capability and compliance in accordance with one or more embodiments described herein. The system 100 can include a forecast manager 102 that can generate a representation or model of a performance of one or more assets in response to a grid event. As utilized herein, an "asset" can be but is not limited to a motor, a pump, a generator, a turbine, a gas turbine, a power plant, a battery, a substation, and other power generation devices. In an example, the forecast manager 102 can generate a model 104 of a target asset 106 based on operation data measured at the target asset during a defined event. According to an implementation, the defined event can be an electrical grid event (e.g., an actual event). The model 104 can be configured to simulate a transient response capability of the target asset 106. According to some implementations, the model can simulate respective transient response capabilities of two or more target assets (e.g., a localized power plant).

In accordance with an implementation, the model 104 can be a physics based model that can be determined based on information known about the assets contained in a local power plant or distribution network. Alternatively or additionally, the model 104 can be a data driven model based on historical information related to the target assets and/or based on information related to other similar assets (regardless of location) and respective transient response capabilities of the other similar assets during a similar grid event.

A compliance manager 108 can determine whether the one or more assets are in compliance with at least one defined parameter. For example, the compliance manager 108 can determine a compliance of the target asset 106 to at least one defined parameter based on the simulated transient response capability of the target asset 106 during a simulated event (that is representative of a local code or regulation) and as a function of the operation data measured during the defined event (e.g., an actual event). According to some implementations, the compliance manager 108 can determine a compliance of the target asset 106 to at least one defined parameter based on the transient response capability of another asset during a grid event that is similar to the grid event under evaluation.

In an example, a local grid code regulation might indicate that, in the event of a one percent grid frequency change, ramped in over ten seconds and held for ten seconds, a generating asset should shift load (in the appropriate direction) by X percent in ten seconds and hold for thirty seconds, where X is an integer. Based on a historical response of the target asset, or a other similar assets, a model can be generated and a determination can be made whether the target asset is expected to be in compliance with the local grid code regulation.

In terms of compliance and prediction of compliance, it has been difficult for utilities (e.g., power generation plants) to measure and/or predict an actual capability and response during various grid events. In some cases, a power generation plant can experience grid events rarely and/or high speed data around the events is rarely captured. Therefore, information as to the real-world transient response capabilities of the assets within that power generation plant is not known. Some methods for testing capability include field tests and/or physics based modeling and simulation.

Field tests can be conducted by injecting a bias on the grid frequency shown to the gas turbine controller so the speed-load governor attempts to respond to what it perceives as a grid event. Field tests rely on deception to mimic the grid event. For example, a signal is placed on top of the actual grid frequency. The signal introduces some noise or bias and indicates to the asset that the grid frequency changed and, therefore, the asset should react to the frequency change. It is noted that during the field tests, the grid frequency actually does not change, nor does the speed of the machine change. Therefore, the field test does not exactly mimic a real event.

Engineering intensive off-line high-fidelity physics based modeling and transient simulation of representative events in studies can be performed for power generation plants as part of control software validation or as an incremental service. However, these simulations are usually controls relevant and, therefore, include the actual control software running the plant, simulated against a best available transient representation of the plant. For example, a high fidelity physics space model of a power plant can be constructed and a computer simulation can be performed that is consistent with the grid regulation. Further, scientific operability studies can be performed to determine whether, based on the model, the power generation plant will be in compliance or out of compliance. Since this type of model is an offline study based on the best understanding of the physics, the validity and/or confidence of the results is high but it is not scientific determination.

The various aspects discussed herein provide a digital alternative to assess grid response capability automatically, and in a more accurate manner With more clarity in actual capability, and in cases where the assets outperform current regulations, an opportunity exists to work with the regulation authorities to increase standards (with the goal of improving grid stability), which can increase consumer satisfaction (e.g., mitigate the occurrence of power outages).

As disclosed herein, a fleet of units can be exposed to grid events periodically. For example, a first asset in a first location (e.g., Pakistan) might see a harsh grid event frequently (e.g., weekly, monthly). However, a second asset (which is similar to the first asset) in a second location (e.g., United States) might experience a harsh grid event less frequently (e.g., every two to three years). Thus, the transient response capability of the first asset (in Pakistan) can be utilized to determine an expected transient response capability of the second asset (in the United States), wherein the assets are of a similar make or model. In such a manner, there can be an aggregation of fleet wide data.

For example, a grid frequency at the first asset might fluctuate at least a defined amount, indicating a grid event. Based on the indication, operational data of the first asset can be captured for a defined period of time before the grid event, throughout the grid event, and for another defined period of time after the event. For example, if grid frequency fluctuates at the first asset, the system can begin capturing the data thirty seconds ahead of the fluctuation and can continue capturing the data until thirty seconds after the grid frequency is stabilized again. For example, there can be an active capture buffer and the last (or most recent) thirty seconds can be held in the buffer. If a trigger event is experienced, the last thirty seconds can be retained or stored and, in addition, data can continue to be stored under after completion of the event. This data can be archived as a transient response capability of the first asset during a particular grid event. Thus, a grid events database can be constructed for the first asset (as well as other assets in the distribution network). Accordingly, an inventory of all events that happened at the one particular site can be retained as historical data.

The historical data can be published to a cloud network (e.g., a data storage or trusted third-party site) and grid events that occurred across the entire fleet, beyond just the first asset, can be analyzed. With the local data and the fleet data, the various aspects can use that data to build a model and continuously improve a model that is indicative of how a related asset would be responding. When a grid event occurs, the model can be exposed to the event and a determination can be made as to how well the model matches the asset (e.g., a feedback loop). Further, the model can be implemented in a predictive mode to determine how the asset might respond, if the grid event matched the language in the regulation.

With continuing reference to FIG. 1, the system 100 can also include at least one memory 110 operatively coupled to at least one processor 112. The at least one memory 110 can store computer executable components and/or computer executable instructions. The at least one processor 112 can facilitate execution of the computer executable components and/or the computer executable instructions stored in the at least one memory 110. The term "coupled" or variants thereof can include various communications including, but not limited to, direct communications, indirect communications, wired communications, and/or wireless communications.

Further, the at least one memory 110 can store protocols associated with distribution network response capability monitoring and compliance determination as discussed herein. Further, the at least one memory 110 can facilitate action to control communication between the system 100, the target asset 106, other systems, and/or other assets, such that the system 100 can employ stored protocols and/or algorithms to achieve improved monitoring and compliance determination as described herein.

It is noted that although the one or more computer executable components and/or computer executable instructions can be illustrated and described herein as components and/or instructions separate from the at least one memory 110 (e.g., operatively connected to at least one memory 110), the various aspects are not limited to this implementation. Instead, in accordance with various implementations, the one or more computer executable components and/or the one or more computer executable instructions can be stored in (or integrated within) the at least one memory 110. Further, while various components and/or instructions have been illustrated as separate components and/or as separate instructions, in some implementations, multiple components and/or multiple instructions can be implemented as a single component or as a single instruction. Further, a single component and/or a single instruction can be implemented as multiple components and/or as multiple instructions without departing from the example embodiments.

It should be appreciated that data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 112 can facilitate respective analysis of information related to grid events and asset responses (e.g., transient response capability) to grid events. The at least one processor 112 can be a processor dedicated to analyzing and/or generating models based on data received, a processor that controls one or more components of the system 100, and/or a processor that both analyzes and generates models based on data received and controls one or more components of the system 100.

Figure 2:
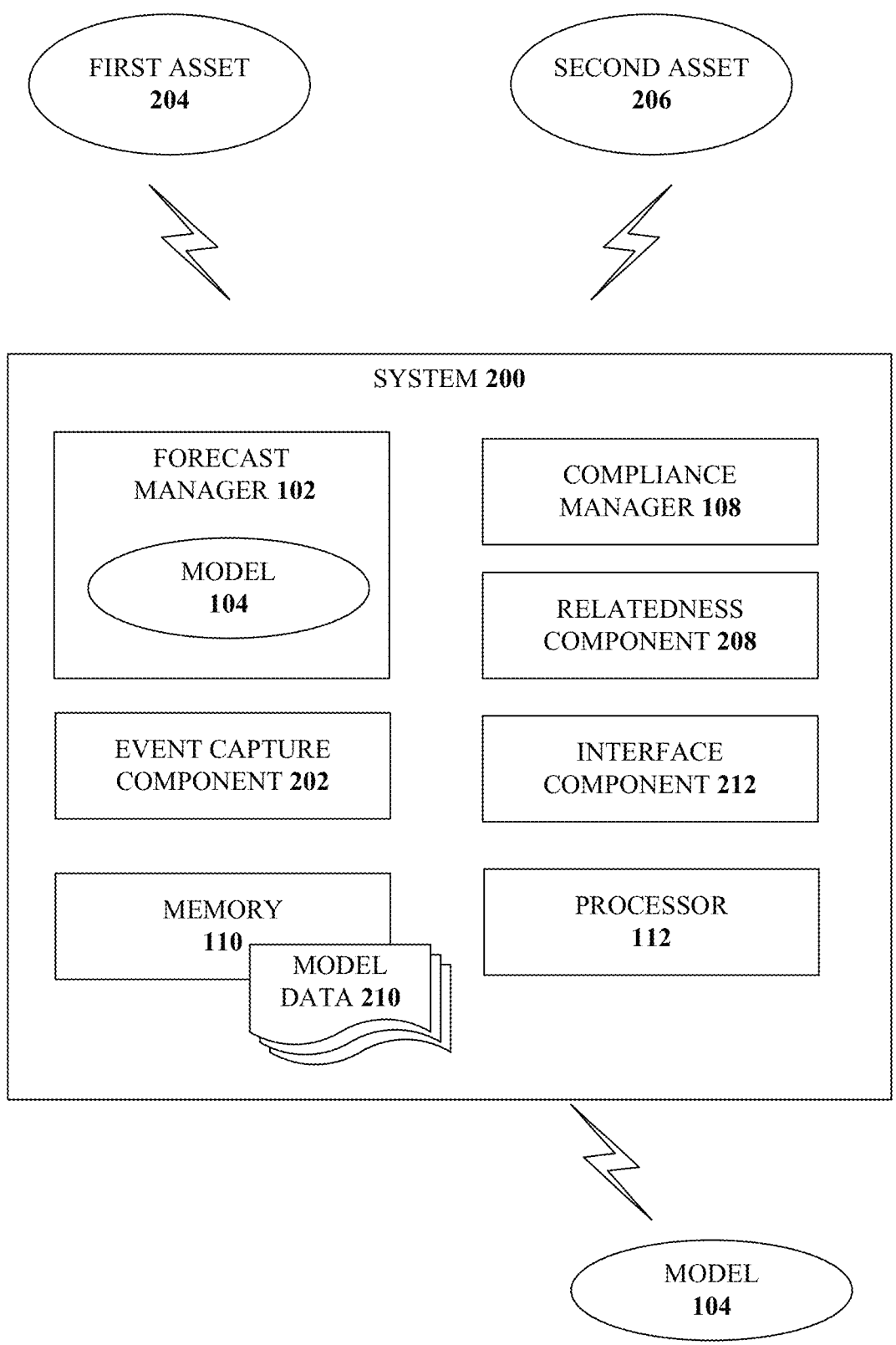
FIG. 2 illustrates an example, non-limiting, system for determining asset compliance in accordance with one or more embodiments described herein.

FIG. 2 illustrates an example, non-limiting, system 200 for determining asset compliance in accordance with one or more embodiments described herein. Repetitive description of like elements employed in other embodiments described herein is omitted for sake of brevity. The system 200 can comprise one or more of the components and/or functionality of the system 100, and vice versa.

The system 200 can comprise an event capture component 202 that can record (or can facilitate the recording by one or more remote devices) one or more grid events at a first asset 204 or at a second asset 206. For example, the event capture component 202 can obtain signals measured by a data recorder operatively coupled to the first asset 204 and/or the second asset 206. The data recorder can begin capturing the data from a first defined period before the defined event, during the defined event, and for a second defined period after the defined event. The first asset 204 and the second asset 206 can be operatively coupled assets. For example, in a distributed system, first asset 204 and the second asset 206 can be operatively coupled through a server, through the cloud (e.g., cloud communication networking), or through other manners of electronic communication.

In an example, the event capture component 202 can facilitate capture of operational data based on a determination that a grid event has occurred. For example, operational data can be captured continuously and, based on detection of a grid event, the operational data can be recorded for a specified amount of time (e.g., a first defined time before the grid event, during the grid event, and for a second defined time after the grid event has been resolved). According to some implementations, the first defined time and the second defined the can be different time periods (e.g., the first defined time can be forty-five seconds and the second defined time can be sixty seconds). However, according to some implementations, the first defined time and the second defined time can be a same time period (e.g., thirty seconds). Although specific time periods can be discussed herein, the various aspects are not limited to these time periods and other time periods can be utilized with the disclosed aspects.

The system 200 can also comprise a relatedness component 208 that can determine whether two or more assets are a similar type of asset. For example, data can be obtained by the event capture component 202 about a transient response capability of the first asset 204 during a grid event. Based on a determination by the relatedness component 208 that the first asset 204 and the second asset 206 are similar assets, the forecast manager 102 can create a model 104 of the second asset 206 based on the data known about the first asset 204. Further, the compliance manager 108 can determine a compliance of the second asset 206 (e.g., target asset) based on the transient response capability of the first asset 204 (e.g., source asset) during a same or similar grid event.

In an example, the event capture component 202 can capture signals measured by a data recorder during the defined event. Additionally, the signals can be captured by the data recorder for a defined period before the event and for a defined period after the event. The data recorder can be associated with (or near) the target asset. However, the disclosed aspects are not limited to this implementation and, according to other implementations, the data recorder can be located remote from the target asset. The signals can be retained in a database and can be mapped to the defined event. According to some implementations, the signals can be retained, at least partially, in the at least one memory 110 as at least a portion of model data 210. However, according to some implementations, the model data 210 can be retained external to the system 200, wherein the system 200 can access the model data 210 as needed.

According to some implementations, the system 200 can determine a first transient response capability of the first asset 204 during an actual event (e.g., a real-world grid event as opposed to a simulated or modeled event). Further, the system 200 can determine a second transient response capability of the second asset 206 based on the first transient response capability of the first asset 204. The first asset 204 and the second asset 206 can be similar assets and can be operatively. In such a manner, even though the second asset 206 might not have experiences a particular grid event, the experiences of the first asset 204 can be utilized to model the second asset 206.

Also included in the system 200 can be an interface component 212 that can facilitate the output of information related to the model 104 and related information. For example, the interface component 212 can facilitate generations of a report based on a request for information related to a defined asset (e.g., the second asset 206 in the above example). Further, the interface component 212 can facilitate an output of the model 104. The model and the report can be output in any perceivable format (e.g., visual, audible).

Figure 3:
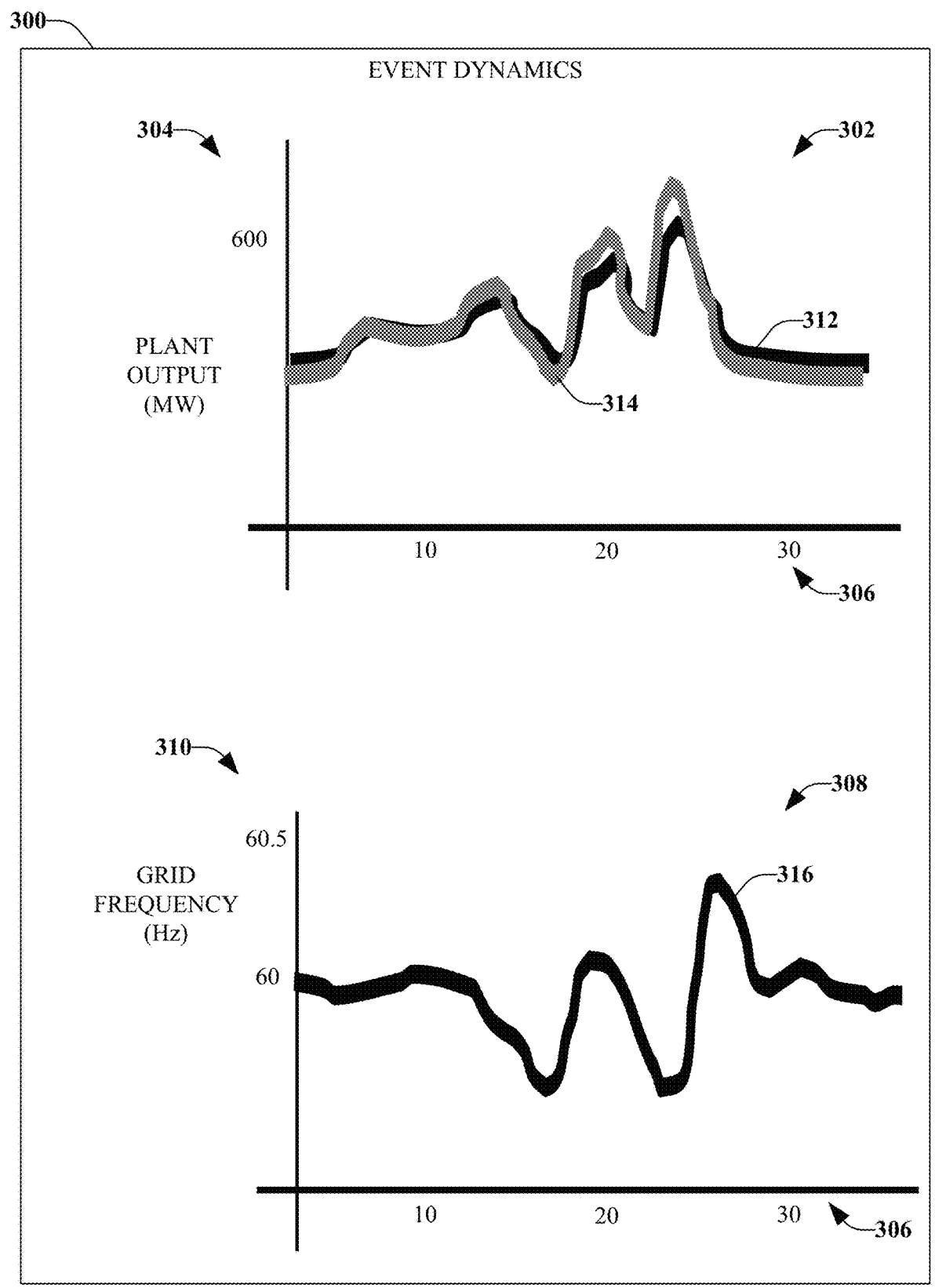
FIG. 3 illustrates an example, non-limiting, graphical representation of event dynamics in accordance with one or more embodiments described herein.

To provide further context, FIG. 3 illustrates an example, non-limiting, graphical representation of event dynamics 300 in accordance with one or more embodiments described herein. The graphical representation of event dynamics 300 can be provided as a portion of an output facilitated by the interface component 212. As illustrated, the event dynamics can include a first chart 302 that represents power plant output 304 (in megawatts (MW)) on the vertical axis. Further, time 306 (in seconds) is represented on the horizontal axis. Also included is a second chart 308 that represents grid frequency 310 (in Hertz (Hz)) on the vertical axis and the representation of time 306 on the horizontal axis.

In the first chart 302, a first line 312 indicates an actual response of plant output and a second line 314 indicates a modeled response in accordance with one or more embodiments described herein (e.g., the model 104). In this example, the modeled response (the second line 314) closely mirrors the actual response (the first line 312). In the second chart 308, the actual grid frequency is represented by line 316. As illustrated, a grid event can have frequency that is moving around erratically and the power generation assets have to respond with load accordingly.

Figure 4:
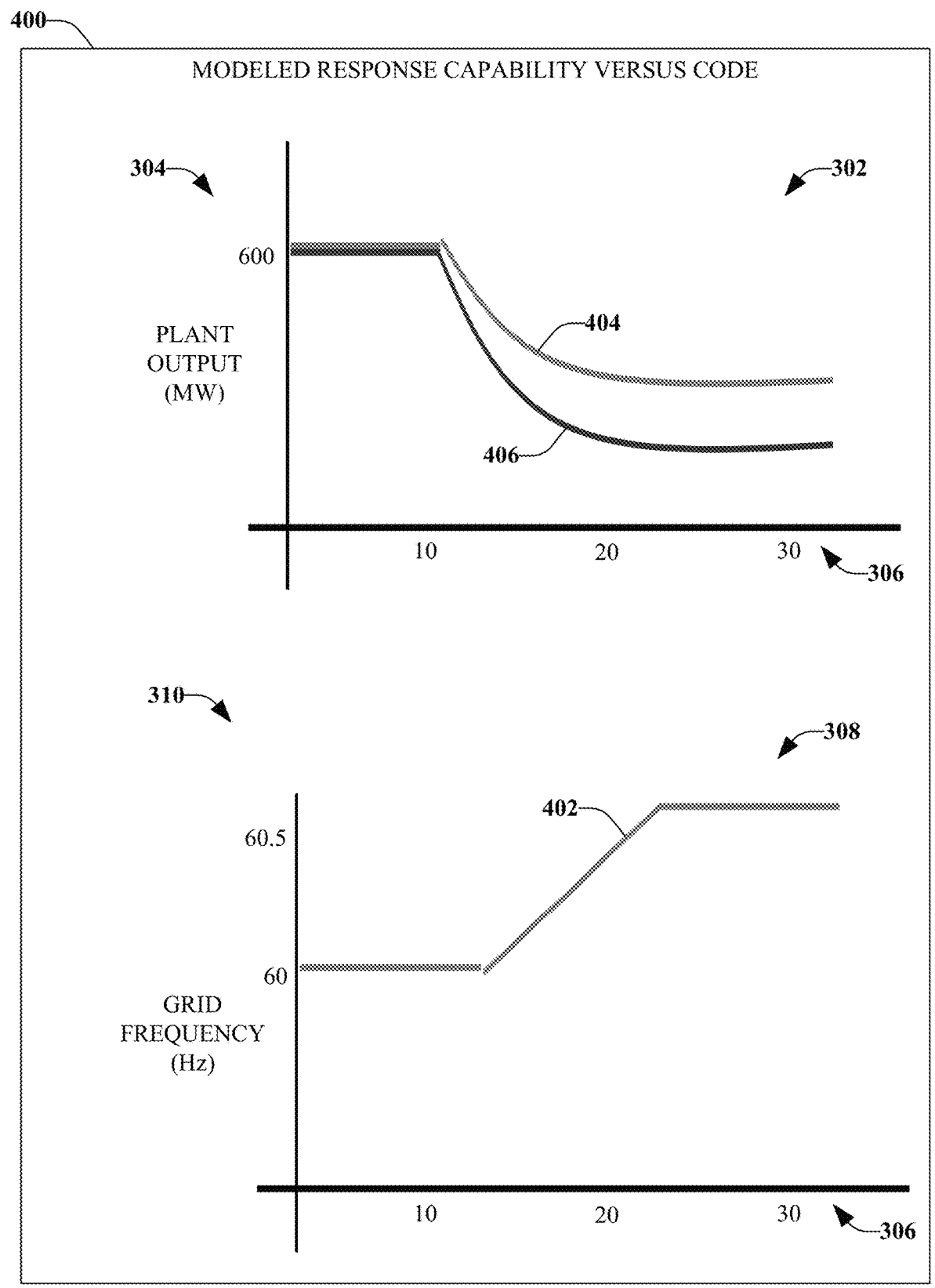
FIG. 4 illustrates an example, non-limiting, graphical representation of a modeled response capability verses an actual asset operation through a grid event in accordance with one or more embodiments described herein.

The erratic curvature of the grid frequency (line 316) is indicative of what occurs during a grid event. Therefore, it is difficult for the governing bodies to articulate the desired responses when drafting local regulations. Therefore, the governing bodies can prescribe the desired responses as depicted in FIG. 4, which illustrates an example, non-limiting, graphical representation of a modeled response capability verses an actual asset operation through a grid event 400 in accordance with one or more embodiments described herein. Repetitive description of like elements employed in other embodiments described herein is omitted for sake of brevity.

As an example, a local code can indicate that if grid frequency shifts by a defined amount (e.g., a percentage), such as a one percent change in grid frequency ramped in over ten seconds and held for ten seconds, as illustrated by line 402 of the second chart 308. In this example situation, the local code can indicate that a power generating asset should shed load at a certain rate and come to a steady state as some reduced load. A measured response from actual operation through a grid event is represented by line 404 and the capability of the asset is indicated by line 406. It is noted that even though this situation is prescribed by the regulation, what actually occurs is what was depicted in the example of FIG. 3. Accordingly, it can be difficult to determine whether one or more assets are in compliance with the regulations and/or a level of compliance for one or more assets.

Figure 5:
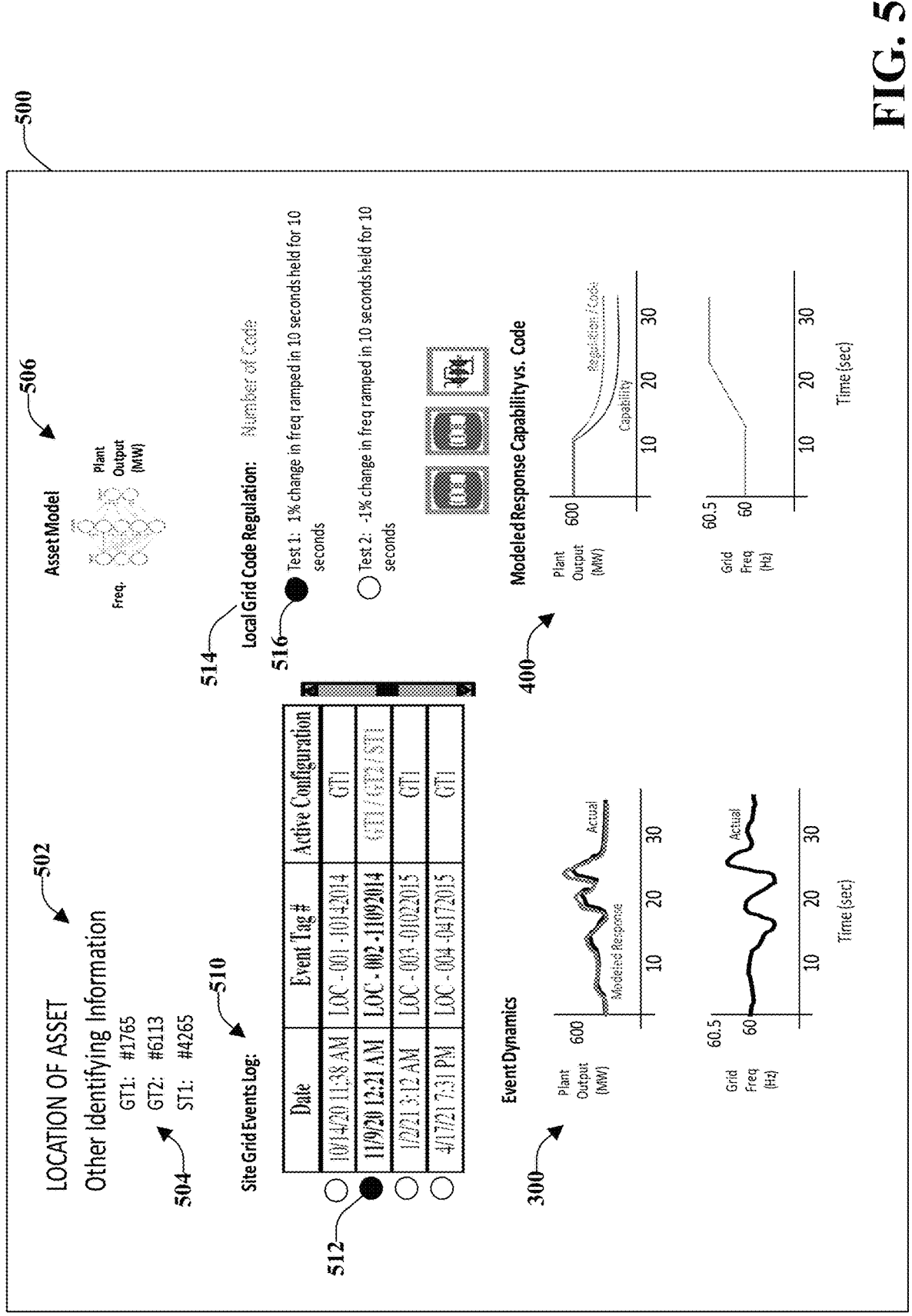
FIG. 5 illustrates an example, non-limiting, graphical user interface that can be provided as output in accordance with one or more embodiments described herein.

FIG. 5 illustrates an example, non-limiting, graphical user interface 500 that can be provided as output (e.g., by the interface component 212 or another component) in accordance with one or more embodiments described herein. Repetitive description of like elements employed in other embodiments described herein is omitted for sake of brevity.

The graphical user interface 500 can be utilized as a grid response capability monitor. As illustrated, a location 502 of the asset(s) under consideration can be provided. Further, each asset can be identified 504 based on a form of identification (e.g., serial number, inventory number, and so on). In this example, the assets are a first gas turbine (GT1), a second gas turbine (GT2), and a first steam turbine (ST1). Further, an asset model 506, which is a graphical representation of the power plant can be included in the graphical user interface 500.

Also included can be a site grid events log 510 which can list the grid events captured over time for the power plant under consideration. As illustrated by the site grid events log 510, historical data can be tracked and retained (e.g., the log 510 is populated over time). The historical data can be identified by date (e.g., day and time) and by an event tag number, or based on another manner of distinguishing the events. Also included in the site grid events log 510 can be an active configuration during the grid event. For example, for a first grid event, the active configuration is GT1, which indicates the first gas turbine was in operation during the identified grid event. Further, for the second grid event (e.g., the grid event selected as indicated by the darkened circle 512), the three assets (GT1, GT2, and ST1) were active.

Also provided can be a selector for choosing a test related to a local grid code regulation 514. As illustrated for this example, a first test (Test 1) is selected, as indicated by darkened circle 516. The first test is a one percent change in frequency ramped in ten seconds and held for ten seconds.

A selection of one of the site grid events and/or tests can be made, such as by clicking within the desired row (e.g., on the data, on the event tag number, and so on). In another example, the event can be selected by using selectors, as indicated by the darkened circle 512. However, other manners of selecting the grid event and/or the test can be utilized through various types of interface (e.g., mouse, keyboard, audible commands, and so on) in accordance with the various aspects discussed herein.

Upon or after a grid event and a test is selected (e.g., the darkened circle 512 and the darkened circle 516), information related to the selection is provided. Such information can include the example, non-limiting graphical representation of event dynamics 300, as discussed with respect to FIG. 3 and/or the example, non-limiting graphical representation of a modeled response capability verses an actual asset operation through a grid event 400, as discussed with respect to FIG. 4.

The graphical user interface 500 can be output on respective mobile devices, which can be facilitated by the interface component 212. A mobile device can also be called, and can contain some or all of the functionality of a system, subscriber unit, subscriber station, mobile station, mobile, mobile device, device, wireless terminal, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects can also be implemented with wired devices, or with both wired and wireless devices.

The interface component (as well as other interface components discussed herein) can provide, a command line interface, a speech interface, Natural Language text interface, and the like. For example, a Graphical User Interface (GUI) can be rendered that provides a user with a region or means to load, import, select, read, and so forth, various requests and can include a region to present the results of the various requests. These regions can include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, can be employed. Thus, it might be inferred that the user did want the action performed.

The user can also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or Application Program Interface (API). In addition, the command line interface can be employed in connection with hardware (e.g., video cards) and/or displays (e.g., black and white, and Video Graphics Array (EGA)) with limited graphic support, and/or low bandwidth communication channels.

Figure 6:
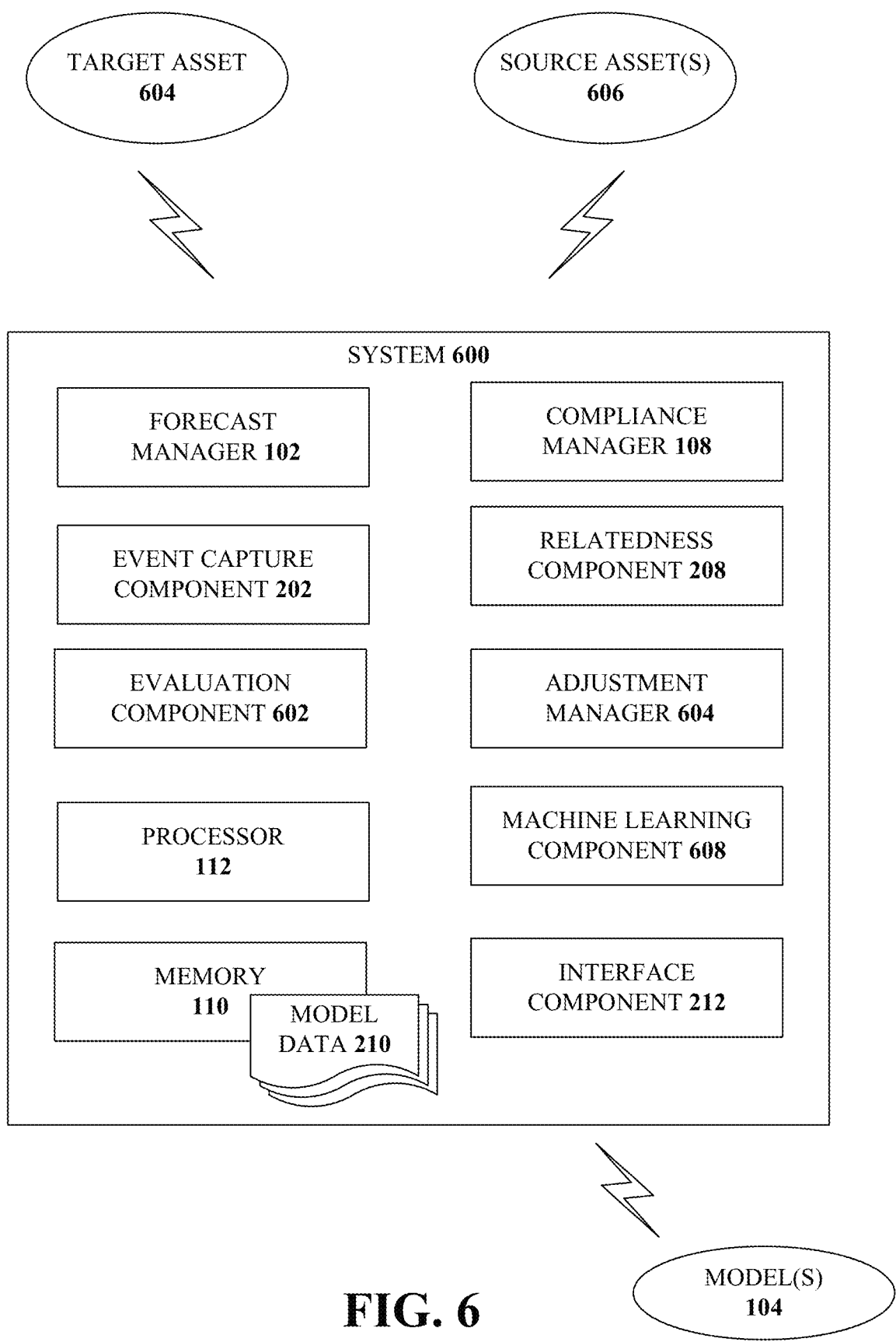
FIG. 6 illustrates an example, non-limiting, system for automatically determining asset performance in accordance with one or more embodiments described herein.

FIG. 6 illustrates an example, non-limiting, system 600 for automatically determining asset performance in accordance with one or more embodiments described herein. Repetitive description of like elements employed in other embodiments described herein is omitted for sake of brevity. The system 600 can comprise one or more of the components and/or functionality of the system 100 and/or the system 200, and vice versa.

The system can include an evaluation component 602 that can evaluate a degradation of the target asset 604. For example, the degradation can be determined based on a degradation of a source asset 606 (or more than one source asset), where the source asset 606 and the target asset 604 are similar assets (e.g., a same type and model number). For example, if the source asset 606 has experienced one or more grid events, those experiences can be utilized to model the target asset 604, which might not have experienced the grid event.

According to an implementation, the evaluation component 602 can determine an expected degradation of the target asset 604 based on an age of the target asset. For example, a model can be generated to indicate if the asset is in compliance. However, a predictive model can also be constructed to indicate that, based on determining the asset will degrade be a certain percentage over the next six months, will the asset still be in compliance six months from today.

In another implementation, the evaluation component 602 can determine an expected degradation based on events, including the defined event, experienced by the target asset 604 and/or experienced by the source asset 606. For example, if a grid event occurred and the asset tripped, or did not survive the event, it is considered a harsh event on the asset. Accordingly, the life of the asset is compromised to some extent (e.g., might need maintenance earlier than expected had the harsh event not been experienced by the asset). Thus, the experiences of the asset can be take in consideration when generating the model and determining the compliance.

The system can include a machine learning and reasoning component 608, which can be utilized to automate one or more of the disclosed aspects. The machine learning and reasoning component 608 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 608 can employ principles of probabilistic and decision theoretic inference. Additionally or alternatively, the machine learning and reasoning component 608 can rely on predictive models constructed using machine learning and/or automated learning procedures. Logic-centric inference can also be employed separately or in conjunction with probabilistic methods.

The machine learning and reasoning component 608 can infer a transient response capability of a first asset by obtaining knowledge about another transient response capability of a second asset that experienced one or more grid events. Based on this knowledge, the machine learning and reasoning component 608 can make an inference based on a relatedness between the first asset and the second asset (e.g., similar components, similar power plant configurations, and so on) as to how the first asset is expected to respond based on the actual response of the second asset.

As used herein, the term "inference" refers generally to the process of reasoning about or inferring states of the system, a component, a module, the environment, and/or assets from a set of observations as captured through events, reports, data and/or through other forms of communication. Inference can be employed to identify a specific context or action, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with distribution network response capability monitoring and compliance determination) can employ various artificial intelligence-based schemes for carrying out various aspects thereof. For example, a process for determining if a defined asset is expected to respond similar to a related asset can be utilized to predict (or model) a transient response capability of the defined asset, which can be enabled through an automatic classifier system and process.

A classifier is a function that maps an input attribute vector, $x=(x1, x2, x3, x4, xn)$, to a confidence that the input belongs to a class. In other words, $f(x)=confidence(class)$. Such classification can employ a probabilistic and/or statistical-based analysis (e.g., factoring into the analysis utilities and costs) to prognose or infer an action that should be employed to determine how an asset is expected to perform when confronted with one or more different types of grid events. In the case of assets, for example, attributes can be identification of a power plant configuration, an age of an asset, previous grid events experienced by the asset (or a similar asset) and the classes are criteria of a local code or a local regulation that specifics how assets should respond when confronted with a defined grid event.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by observing and recording asset behavior, by receiving extrinsic information, and so on). For example, SVM's can be configured through a learning or training phase within a classifier constructor and feature selection module. Thus, a classifier(s) can be used to automatically learn and perform a number of functions, including but not limited to determining according to a predetermined criteria how an asset might respond to a grid event, how a fleet of assets might respond to a grid event, which assets are related even if those assets are not in a similar location and/or are regulated by different local regulations, and so forth. The criteria can include, but is not limited to, similar grid events, historical information, and so forth.

Additionally or alternatively, an implementation scheme (e.g., a rule, a policy, and so on) can be applied to control and/or regulate modeling of assets and resulting actions, inclusion of a group of assets to determine how a defined asset will respond, and so forth. In some implementations, based upon a predefined criterion, the rules-based implementation can automatically and/or dynamically interpret compliance to a local regulation. In response thereto, the rule-based implementation can automatically interpret and carry out functions associated with the local regulations and expected compliance by employing a predefined and/or programmed rule(s) based upon any desired criteria.

Figure 7:
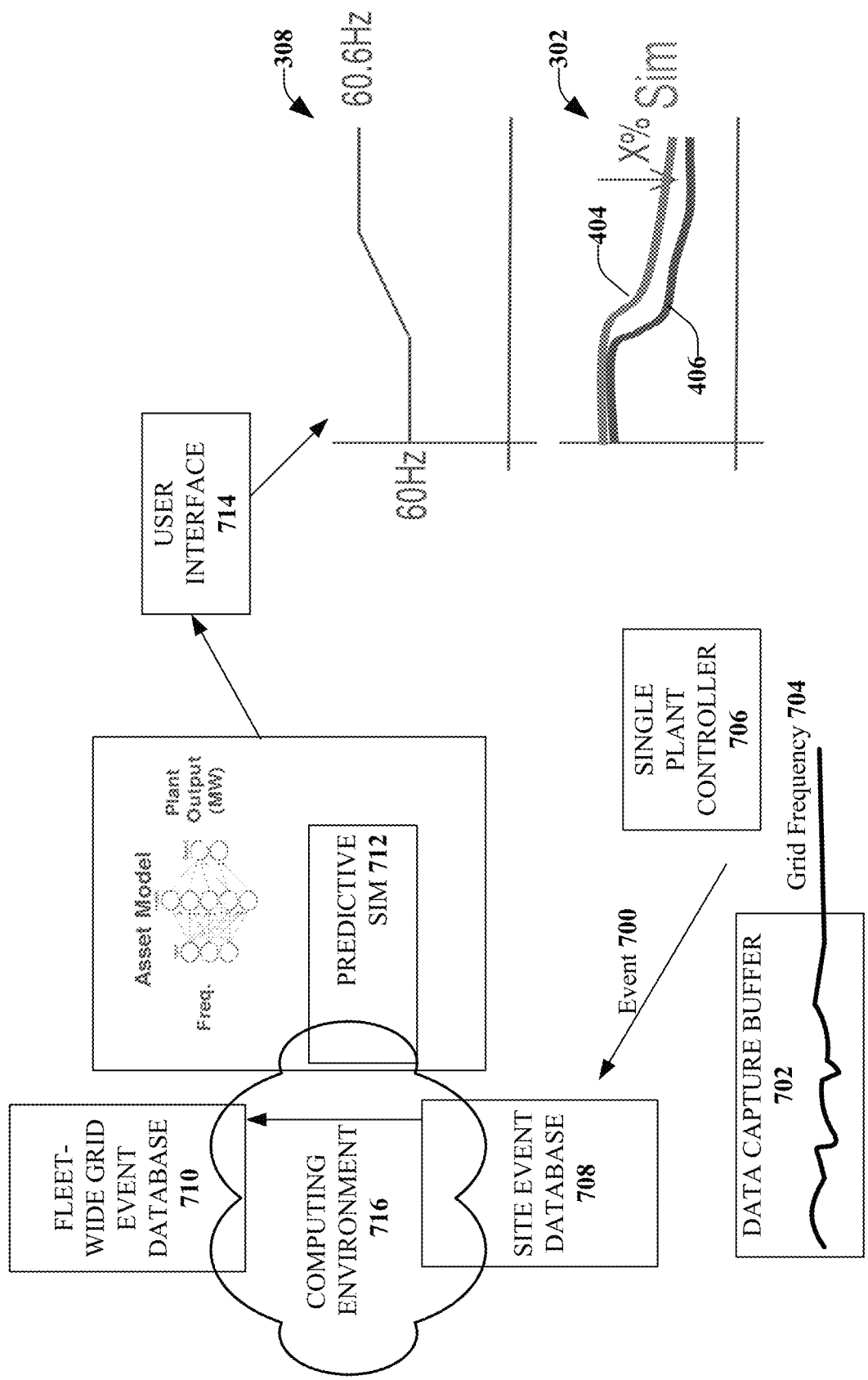
FIG. 7 illustrates an example, non-limiting, representation of a cloud-based implementation of the various aspects in accordance with one or more embodiments described herein.

To provide further context, FIG. 7 illustrates an example, non-limiting, representation of a cloud-based implementation of the various aspects in accordance with one or more embodiments described herein. Repetitive description of like elements employed in other embodiments described herein is omitted for sake of brevity. In accordance with some implementations software platform for the collection and analysis of data from industrial machines, can be utilized to facilitate a grid response capability monitor.

During a grid event 700, a power generating asset should comply with regulations that specify units to shed and/or to pick up extra load output to match the grid demand Sudden changes in demand can alter the grid frequency causing immediate changes in the rotor speed, for example.

In order to determine how assets respond to grid events, a cloud-based implementation (e.g., an application ecosystem or development platform) can be implemented to monitor for grid events. For example, an application ecosystem or development platform can be hosted in the cloud, at least partially, or at the edge of a network. The various embodiments can use high-speed data to create models or asset representations to predict how a power plant is expected to respond to a future grid upset.

As illustrated, a high-speed data capture buffer 702 (e.g., the event capture component 202) can detect a grid event based on a change in grid frequency 704. As illustrated a single plant controller 706 can retain details of the grid event 700 is a site specific grid events database 708. These details can be aggregate with data related to other grid events across a fleet and the aggregated data can be retained in a fleet-wide grid events database 710. Monitoring and diagnostics, as discussed herein can be performed across the fleet based on the aggregated data.

For example, as illustrated a predictive simulation 712 (e.g., via the forecast manager 102) can be implemented to create a model or representation (e.g., a prediction) of how a particular asset, or more than one asset, will respond during a defined grid event. The model information can be provided to an entity through a user interface 714 (e.g., facilitated by the interface component 212). As illustrated, the site specific grid events database 708, the fleet-wide grid events database 710, and/or the predictive simulation 712 can be included, at least partially, in a cloud computing environment 716.

The following describes an example, non-limiting implementation in accordance with FIG. 7. High speed data recorders can be implemented at a control system with data capture buffers to capture key signals at 4 ms frame rates, for example, and package the data set as a grid event The grid event data set can be stored in a site specific grid events database 708 at the site. Next, the grid event data set can be relayed to the cloud computing environment 716 (e.g., the "cloud") and stored in the fleet-wide grid events database 710.

The site specific grid events database and insights from the fleet can be leveraged to construct and improve a site specific asset model that can be automatically tuned (improved) with the data as the machine degrades, and as more "experience" is gained through exposure to other events.

The model of the generating block should consider the response of all assets under consideration. In a combined cycle block, the model can reflect the entire blocks response, but should recognize that the combined cycle block can experience events while operating the assets in a simple cycle scheme, or in a 1×1 scheme with different types of assets (e.g., one gas turbine and one steam turbine, multiple gas turbines, and so on).

The model could be physics-based, data driven, or both physics-based and data driven. Further, the model can be used to simulate past grid events to show its accuracy against historical actual data sets. The model can be used to simulate a grid test that is consistent with the language of the local grid codes to provide a direct view of compliance. It should be noted that grid events drive these dynamic closed-loop systems through complex transients whose shape/trajectory is far from the simply stated grid regulations.

As discussed herein, the various aspects can be reliability centric with a focus on turbine and/or plant operability. Further, the various aspects can be original equipment manufacturer and frame agnostic and can support gas turbine and plant perspectives. In addition, stronger analytics can be developed with larger fleets as the prevalence of data (experience) would be higher. Further, the fleet data can be utilized to accelerate learning of the application and/or algorithms as grid events around a particular generating asset could be rare or infrequent.

The various aspects utilize data around grid events being captured, organized, stored, and analyzed at a unit and fleet data. This can be implemented utilizing a cloud-based platform as service, which can enable industrial-scale analytics for asset performance management (APM) and operations optimization by providing a standard way to connect machines, data, and people. Further, with cloud connectivity in the Internet of Things (IoT) space can be utilized to implement the various aspects discussed herein.

Figure 8:
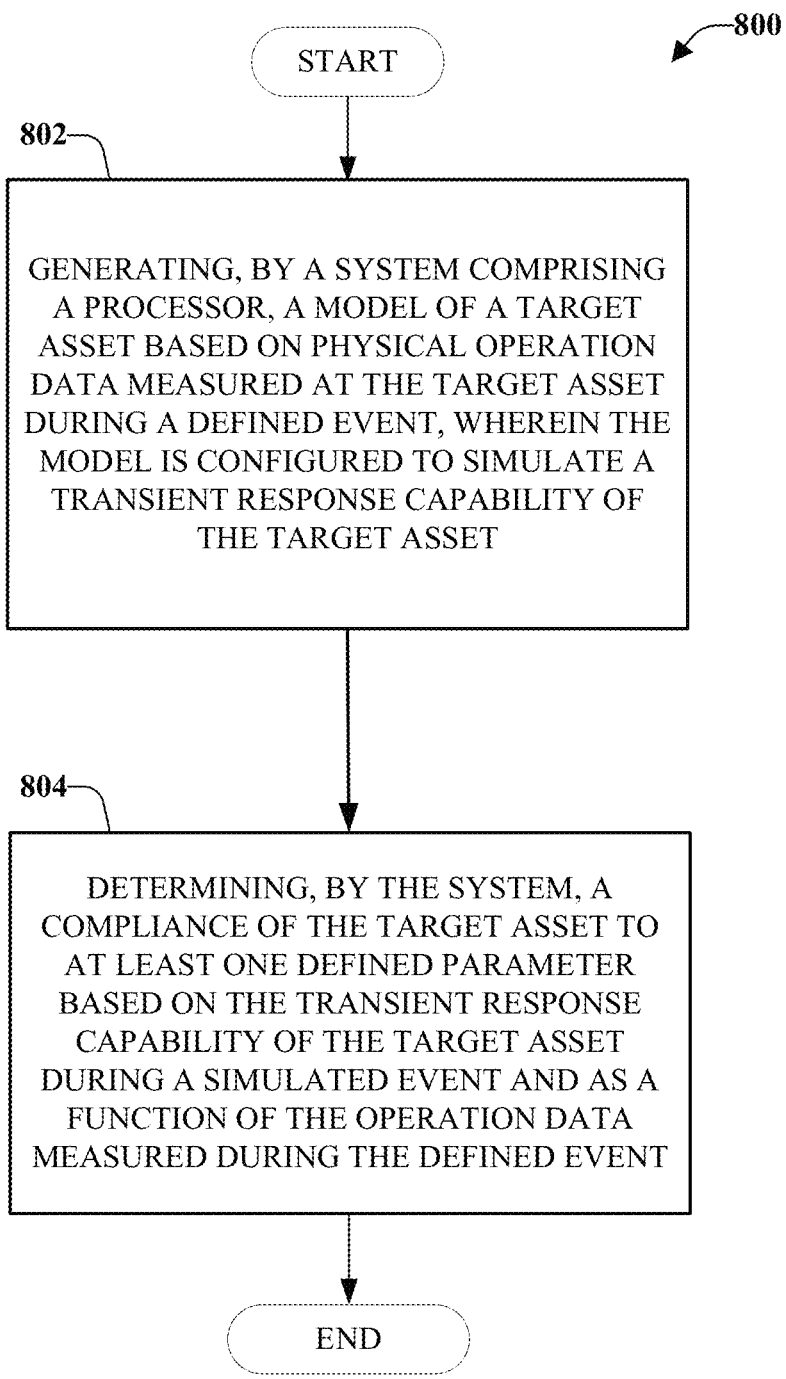
FIG. 8 illustrates an example, non-limiting, method for distribution network response capability monitoring and compliance determination in accordance with one or more embodiments described herein.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram FIG. 8 illustrates an example, non-limiting, method 800 for distribution network response capability monitoring and compliance determination in accordance with one or more embodiments described herein. At 802, a system comprising a processor, can generate a model of a target asset based on operation data measured at the target asset during a defined event. The model can be configured to simulate a transient response capability of the target asset. According to an implementation, the event can be an electrical grid event. The model can be a physics based model, a data driven model, or a physics based and a data driven model.

At 804, the system can determine a compliance of the target asset to at least one defined parameter based on the transient response capability of the target asset during a simulated event and as a function of the operation data measured during the defined event. According to some implementations, the target asset can be a power generating asset and the at least one defined parameter comprises a grid code regulation.

Figure 9:
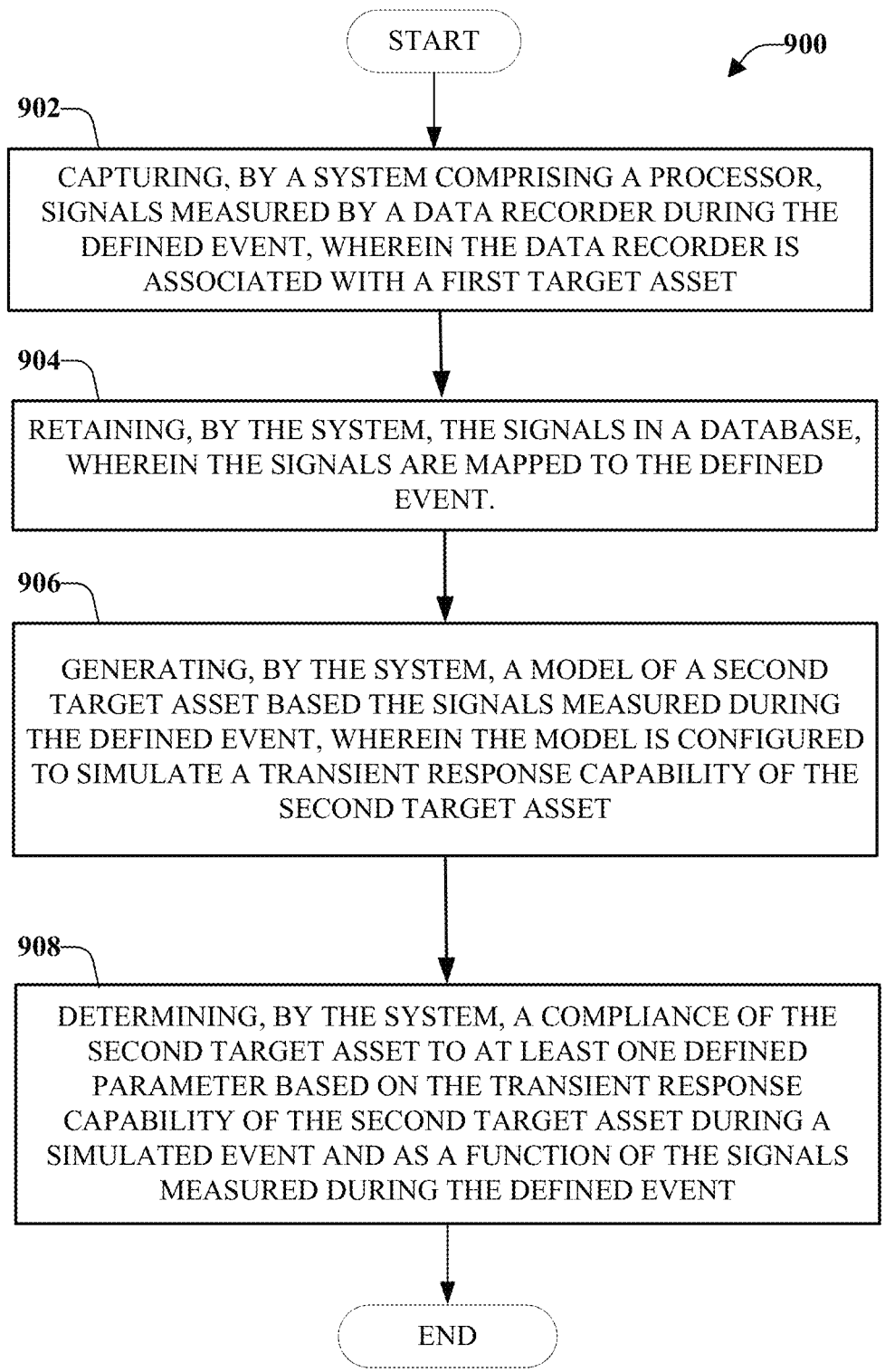
FIG. 9 illustrates an example, non-limiting, method for utilizing historical information to determine target asset compliance in accordance with one or more embodiments described herein.

FIG. 9 illustrates an example, non-limiting, method 900 for utilizing historical information to determine a target asset compliance in accordance with one or more embodiments described herein. The method can be implemented on a machine-readable storage media comprising executable instructions that, when executed by a processor, facilitate performance of the method 900. At 902, a system comprising a processor can capture signals measured by a data recorder during the defined event, wherein the data recorder is associated with a first target asset. The signals can comprise a first transient response capability and a response compliance of the first target asset. The signals can be retained, at 904, in a database and mapped to the defined event. For example, the signals can be retained locally at a site specific database and also transmitted to a fleet wide database (e.g., over a cloud computing network).

The method 900 can continue at 906 when the system generates a model of a second target asset based the signals measured during the defined event. The model can be configured to simulate a second transient response capability of the second target asset based on the first transient response capability and the response compliance of the first target asset. The first target asset can be located in a first geographical area with a first local regulation and the second target asset can be located in a second geographical area with a second local regulation. The first target asset and the second target asset can be operatively coupled over a cloud computing network At 908, the system can determine a compliance of the second target asset to at least one defined parameter based on the transient response capability of the second target asset during a simulated event and as a function of the signals measured during the defined event. According to some implementations, the method can include evaluating a degradation of the second target asset and adjusting the model based on the degradation of the second target asset. Further to these implementations, the evaluation can be based on an expected degradation of the second target asset as a result of an age of the second target asset.

Figure 10:
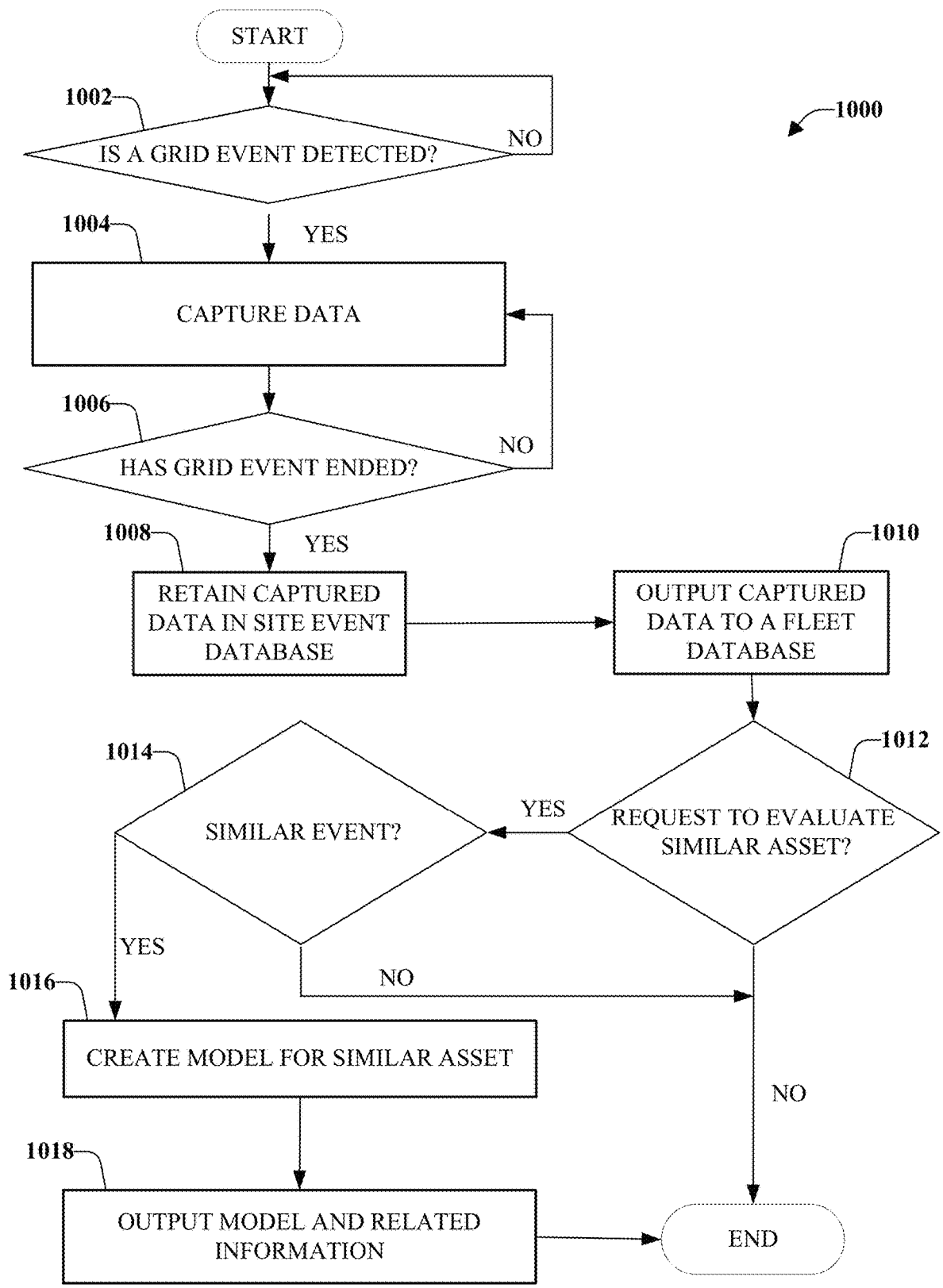
FIG. 10 illustrates an example, non-limiting, method for determining compliance of a target asset to at least one defined parameter based on transient response capability of the target asset during a simulated event and as a function of physical operation data measured during the defined event in accordance with one or more embodiments described herein.

FIG. 10 illustrates an example, non-limiting, method 1000 for determining compliance of a target asset to at least one defined parameter based on transient response capability of the target asset during a simulated event and as a function of physical operation data measured during the defined event in accordance with one or more embodiments described herein.

The method 1000 starts at 1002 with a determination whether a grid event has occurred at a first asset. For example, the determination can be made based on a determination that a frequency has changed in a manner that indicates a grid event is occurring, or is about to occur. If the determination is that a grid event is not detected ("NO"), the method 1000 waits for a detection of a grid event.

If the determination is that a grid event is detected ("YES"), at 1004 data at the one or more assets experiencing the grid event are captured. The data can be captured for a time period from about the time the grid event was detected (or earlier) through an expiration of the event. A determination can be made at 1006 whether the grid event has ended. The determination can be made based on whether or not the grid frequency has stabilized. If the determination is that the grid frequency has not stabilized and the grid event has not ended ("NO") the method 1000 continues to capture data at 1004.

If the determination is that the grid frequency has stabilized and, therefore, the grid event has ended ("YES"), the captured data is retained in a site event database. The site event database can be a database associated with a location that experienced the grid event (e.g., a power plant). At 1010, the captured data is output to a fleet database. For example, the data can be transmitted over a wireless network (e.g., to the cloud). The data can be transmitted based on a request for the data, at periodic intervals, at random intervals, or based on another factor (e.g., after detection of a grid event and stabilization after the grid event).

The method 1000 continues when a request for an evaluation of an asset is received. The asset to be evaluated can be different from the asset(s) that experienced the grid events. Further, the asset to be evaluated can be located in a different geographic area than the asset(s) that experienced the grid event. At 1012, a determination is made whether the request is for evaluation of an asset that is similar to the asset(s) that experienced the grid event. If the asset is not similar ("NO"), the method can end.

If the asset is a similar asset ("YES"), at 1014 a determination can be made whether the evaluation is for a similar event as the captured grid event. If the event is not similar ("NO"), the method can end. If the event is similar ("YES"), at 1016, a model of the similar asset (e.g., the asset requested to be evaluated) can be created. For example, the model can provide a representation of a transient response capability of the similar asset based on another transient response capability of the asset that experienced the grid event. The model and related information can be output at 1018 in a perceivable format.

Figure 11:
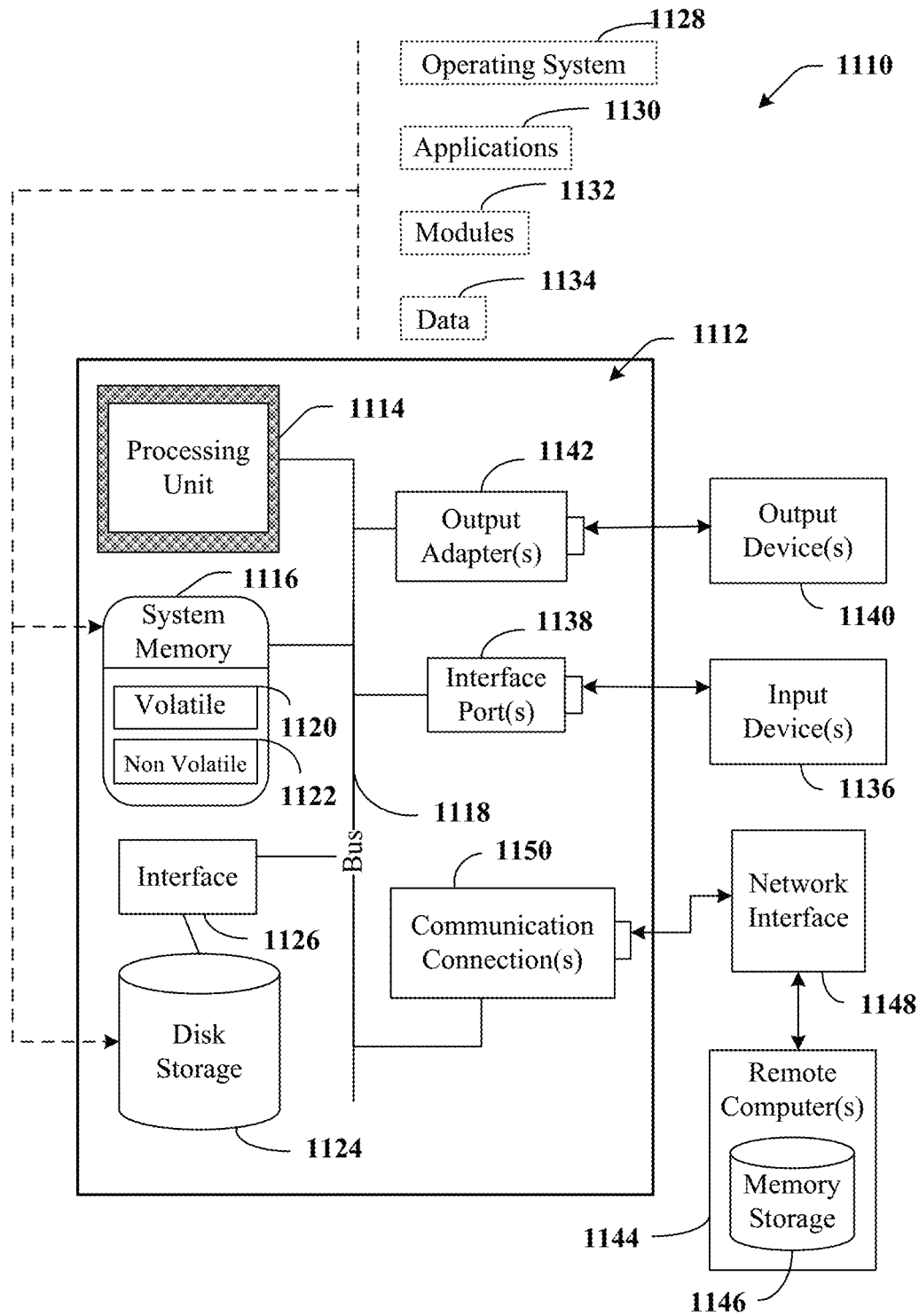
FIG. 11 illustrates an example, non-limiting, computing environment in which one or more embodiments described herein can be facilitated.
Figure 12:
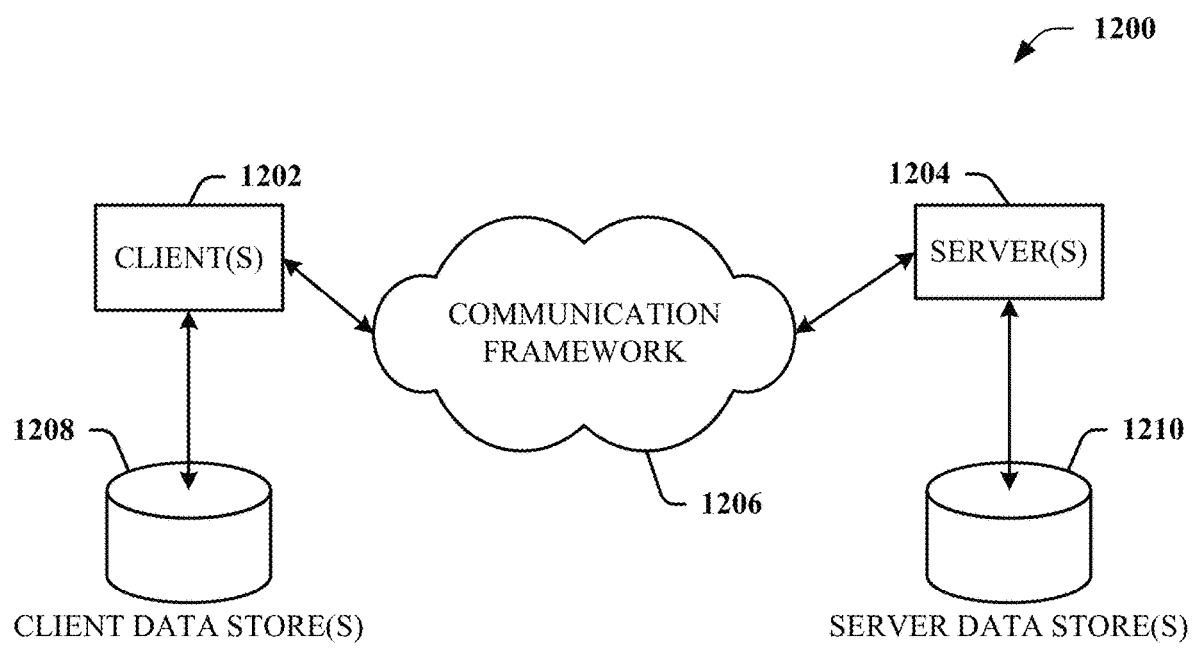
FIG. 12 illustrates an example, non-limiting, networking environment in which one or more embodiments described herein can be facilitated.

In order to provide a context for the various aspects of the disclosed subject matter, FIGS. 11 and 12 as well as the following discussion are intended to provide a brief, general description of a suitable environment in which the various aspects of the disclosed subject matter can be implemented.

With reference to FIG. 11, an example environment 1110 for implementing various aspects of the aforementioned subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Multi-core microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable PROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer 1112. System applications 1130 take advantage of the management of resources by operating system 1128 through program modules 1132 and program data 1134 stored either in system memory 1116 or on disk storage 1124. It is to be appreciated that one or more embodiments of the subject disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapters 1142 are provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the system bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample computing environment 1200 with which the disclosed subject matter can interact. The sample computing environment 1200 includes one or more client(s) 1202. The client(s) 1202 can be hardware and/or software (e.g., threads, processes, computing devices). The sample computing environment 1200 also includes one or more server(s) 1204. The server(s) 1204 can also be hardware and/or software (e.g., threads, processes, computing devices). The servers 1204 can house threads to perform transformations by employing one or more embodiments as described herein, for example. One possible communication between a client 1202 and servers 1204 can be in the form of a data packet adapted to be transmitted between two or more computer processes. The sample computing environment 1200 includes a communication framework 1206 that can be employed to facilitate communications between the client(s) 1202 and the server(s) 1204. The client(s) 1202 are operably connected to one or more client data store(s) 1208 that can be employed to store information local to the client(s) 1202. Similarly, the server(s) 1204 are operably connected to one or more server data store(s) 1210 that can be employed to store information local to the servers 1204.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   measuring, by a system comprising a processor, physical operation data at a first target asset based on detection of a defined event at the first target asset, wherein the detection is based on fluctuation of a grid frequency at the first target asset by at least a defined amount, by a data recorder comprising at least one sensor operatively coupled to the first target asset, wherein the measuring the physical operation data is performed during the defined event and from a beginning of a first defined period of time before the defined event to an end of a second defined period of time after the defined event;

retaining, by the system, signals associated with the physical operation data in a data store, wherein the signals are mapped to the defined event;

generating, by the system, a forecast model of a second target asset based on the physical operation data of the first target asset, wherein the generating comprises employing, by the system, machine learning procedures to determine a transient response capability of the second target asset based on an actual response of the first target asset, wherein the second target asset and the first target asset are a similar type of asset, and wherein the forecast model is configured to simulate the transient response capability of the second target asset, wherein the first target asset is in a first geographic area and the second target asset is in a second geographic area different from the first geographic area and are operatively connected via a cloud computing network;

determining, by the system, a level of compliance of the second target asset to at least one defined parameter based on the transient response capability of the second target asset during a simulated event as a function of the physical operation data measured before, during, and after the defined event; and outputting, by the system, the forecast model of the second target asset and information indicative of the level of compliance of the second target asset, wherein the outputting is on a display of a mobile device.

2. The method of claim 1, wherein the transient response capability of the second target asset is a first transient response capability of the second target asset, and wherein the determining the level of compliance of the second target asset comprises:

determining, by the system, a second transient response capability of the first target asset during an actual event; and determining, by the system, the level of compliance of the second target asset based on the second transient response capability of the first target asset and a determined relatedness between the first target asset and the second target asset.

3. The method of claim 1, further comprising:
capturing, by the system, the signals measured by the data recorder during the defined event as measured from the beginning of the first defined period of time to the end of the second defined period of time.

4. The method of claim 1, further comprising:
evaluating, by the system, a degradation of the first target asset, wherein the forecast model of the second target asset is based, in part, on the degradation of the first target asset.

5. The method of claim 4, wherein the evaluating the degradation comprises determining an expected degradation of the first target asset based on an age of the first target asset.

6. The method of claim 4, wherein the evaluating the degradation comprises determining an expected degradation based on events, including the defined event, experienced by the first target asset.

7. The method of claim 1, wherein the defined event is an electrical grid event.

8. The method of claim 1, wherein the second target asset is a power generating asset and the at least one defined parameter comprises a grid code regulation.

9. The method of claim 1, wherein the forecast model is a physics based model.

10. The method of claim 1, wherein the forecast model is a data driven model.

11. The method of claim 1, wherein the forecast model is a physics based and a data driven model.

12. A system, comprising:
a memory that stores executable components; and
a processor, operatively coupled to the memory, that executes the executable components, the executable components comprising:
an event capture component that obtains digital signals measured by a data recorder comprising a sensor operatively attached to a source asset, wherein the digital signals comprise physical operation data at the source asset based on detection of a defined event at the source asset, and wherein the data recorder measures, before, during and after the defined event, the physical operation data of the source asset based on fluctuation of a grid frequency at the source asset by at least a defined amount;
a data store, wherein the digital signals are stored in the data store, and wherein the physical operation data is mapped to the defined event;
a forecast manager that generates a forecast model of a target asset based on the physical operation data of the source asset, wherein the forecast model employs automated learning and reasoning machine learning procedures to simulate a transient response capability of the target asset and is based on an actual response of the source asset, wherein the source asset and the target asset are a similar type of asset, wherein the source asset is in a first geographic area and the target asset is in a second geographic area different from the first geographic area, and wherein the source asset and the target asset are communicatively coupled via a cloud computing network;
a compliance manager that determines a level of compliance of the target asset to at least one defined parameter based on the transient response capability of the source asset during a simulated event and as a function of the physical operation data measured before, during, and after the defined event; and
an interface component that outputs the forecast model of the target asset and information indicative of the level of compliance of the target asset on a mobile device that is remote from the system.

13. The system of claim 12, wherein the at least one defined parameter is a local code regulation related to operation of the target asset during the defined event.

14. The system of claim 12, wherein the target asset is a power generating asset and the at least one defined parameter comprises a grid code regulation.

15. The system of claim 12, further comprising:
a relatedness component that determines the target asset is similar to the source asset, wherein the source asset has experienced the defined event and data related to the source asset during the defined event is retained as historical data, wherein the forecast manager utilizes the data related to the source asset to generate the forecast model of the target asset.

16. The system of claim 12, wherein the forecast model is a physics based model, a data driven model, or a combination thereof.

17. A non-transitory machine-readable medium, comprising executable instructions that, when executed by a processor, facilitate performance of operations, comprising:
  capturing signals measured by a data recorder before, during, and after a defined event, wherein the capturing is based on a fluctuation of a grid frequency at a first target asset by at least a defined amount, wherein the data recorder comprises sensors operatively connected to the first target asset, and wherein the signals comprise a first transient response capability and a response compliance of the first target asset;
  retaining the signals in a database, wherein the signals are mapped to the defined event;
  employing machine learning to generate a forecast model of a second target asset based on the signals measured before, during, and after the defined event at the first target asset, wherein the machine learning is employed to determine, based on the first target asset and the second target asset being a similar type of asset, an expected response of the second target asset based on an actual response of the first target asset, and wherein the forecast model is configured to simulate a second transient response capability of the second target asset based on the first transient response capability and the response compliance of the first target asset, wherein the first target asset is in a first geographic area and the second target asset is in a second geographic area different from the first geographic area and are operatively connected via a cloud computing network;
  determining a level of compliance of the second target asset to at least one defined parameter based on the second transient response capability of the second target asset during a simulated event and as a function of the signals measured before, during, and after the defined event; and
  outputting, on a mobile device, a graphical user interface that comprises the forecast model of the second target asset and information related to the level of compliance of the second target asset.

18. The non-transitory machine-readable medium of claim 17, wherein the first geographical area comprises a first local regulation and the second geographical area comprises a second local regulation.

19. The non-transitory machine-readable medium of claim 17, wherein the operations further comprise:
  evaluating a degradation of the first target asset, wherein the generating the forecast model is based on an expected degradation of the second target asset based on the degradation of the first target asset, wherein the evaluating is based on the expected degradation of the second target asset as a result of an age of the second target asset.

* * * * *